(No Model.)
C. E. BUELL.
GALVANIC BATTERY.
No. 263,651. Patented Aug. 29, 1882.
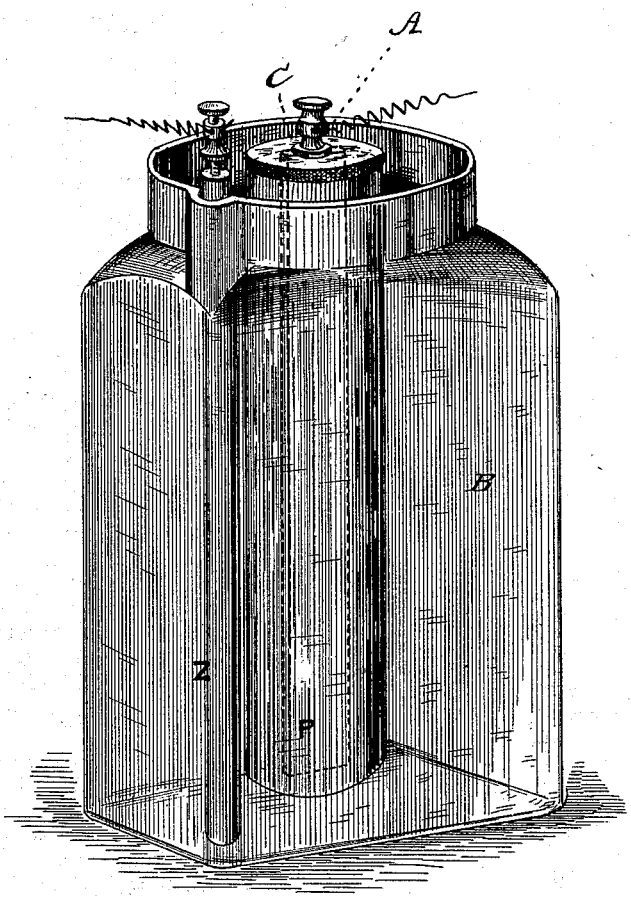
Witnesses:
Fred. G. Dietrich
P. C. Dietrich
Inventor:
Charles E. Buell

United States Patent Office.

CHARLES E. BUELL, OF NEW HAVEN, CONNECTICUT, ASSIGNOR OF ONE-HALF TO JULIUS H. APPLETON, OF SPRINGFIELD, MASSACHUSETTS.

GALVANIC BATTERY.

SPECIFICATION forming part of Letters Patent No. 263,651, dated August 29, 1882.

Application filed March 10, 1880. (No model.)

*To all whom it may concern:*

Be it known that I, CHARLES E. BUELL, of the city and county of New Haven, and State of Connecticut, have invented certain new and useful Improvements in Galvanic Batteries, of which the following is a specification.

My invention relates to that class of batteries known as "open-circuit batteries," and is applicable to telegraph, alarm, and signaling circuits.

The object of my invention is to afford a compact and economical form of battery, that can be readily renewed, and which may be kept unused with no perceptible loss. This object I accomplish by the means shown in the accompanying drawing.

The figure represents the cell B, of glass or earthenware, containing the porous cell A. In the porous cell A is a lead or carbon plate, $p$, around which is packed lime or other convenient vehicle saturated with chlorine or chlorinated liquid, and the porous cell sealed with the plate $p$, connections penetrating therethrough at $c$ to receive the conducting-wire. The porous cell A is surrounded by a dense solution of chloride of sodium, a weak solution of muriatic or sulphuric acid, or other analogous exciting solution, preferably the solution of common salt, into which the zinc plate Z is placed, and connections made in the ordinary manner of connecting batteries.

The outside cell, B, may be made with a narrower mouth than shown, when it is desired to seal both the cell A and B.

Broken coke or charcoal can be mixed with the lime, and when it becomes necessary to replenish the cell A with chlorine they (the cells) may be dried and submerged in a strong solution of chlorinated water or placed in an atmosphere of chlorine, the lime being moistened and the gas more dense than ordinary atmosphere.

What I claim as new, and desire to secure by Letters Patent, is—

In a galvanic battery, the combination of a porous cup or containing-vessel and a carbon plate contained therein and surrounded by a mixture of broken carbon and chloride of lime in a moist state, substantially as and for the purpose set forth.

I have hereunto set my name, in the presence of these subscribing witnesses, this 9th day of March, A. D. 1880.

CHARLES E. BUELL.

Witnesses:
 GEO. F. GRAHAM,
 DEVERE BURR.